United States Patent
Kadowaki et al.

(12) 
(10) Patent No.: US 6,654,336 B2
(45) Date of Patent: Nov. 25, 2003

(54) SEMICONDUCTOR LIGHT SOURCE, OPTICAL PICKUP HEAD APPARATUS, AND DATA RECORD/PLAYBACK APPARATUS

(75) Inventors: Shin-ichi Kadowaki, Sanda (JP); Yoshiaki Komma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 09/898,010

(22) Filed: Jul. 5, 2001

(65) Prior Publication Data

US 2002/0003766 A1 Jan. 10, 2002

(51) Int. Cl.$^7$ ................................................. G11B 7/00
(52) U.S. Cl. ............................... 369/112.07; 369/44.37; 369/112.1
(58) Field of Search ..................... 369/112.01, 112.03, 369/112.05, 112.07, 112.1, 112.15, 44.11, 44.14, 44.23, 44.37

(56) References Cited

U.S. PATENT DOCUMENTS 5,982,732 A * 11/1999 Yamanaka ............. 369/112.15
6,404,709 B1 * 6/2002 Kouno ..................... 369/44.23

FOREIGN PATENT DOCUMENTS

JP           10-289468           10/1998

* cited by examiner

*Primary Examiner*—Muhammad Edun
(74) *Attorney, Agent, or Firm*—Wenderoth, Lind & Ponack, L.L.P.

(57) ABSTRACT

The light source package comprises a first light source for emitting a first light beam, a second light source for emitting a second light beam which is different from the first light beam, and a deflection arrangement which deflects the first and second light beam and releasing the deflected light beam as a third light beam. The deflection arrangement includes a first and second deflectors which deflects the first and second light beams such that the optical axes of the first and second deflected light beams are substantially coincide.

14 Claims, 16 Drawing Sheets

SEMICONDUCTOR LIGHT SOURCE, OPTICAL PICKUP HEAD APPARATUS, AND DATA RECORD/PLAYBACK APPARATUS

BACKGROUND OF THE INVENTION

1. Field of the Invention

The present invention relates to a semiconductor light source for emitting a light beam of two different wavelengths and an optical pickup head apparatus and a data record/playback apparatus for storage, playing back, and erasing data on an optical disk.

2. Description of the Related Art

Optical disks are known as high-density, mass-storage mediums on which data is stored in the form of a pattern of bits. The optical disks are classified into various types depending on the contents of data and the application. Characteristic examples of the optical disks are digital audio disks, video disks, text file disks, data file disks and so forth. Their applications are now increased as they are spread into in different fields. In particular, digital versatile disks (DVD) are popular and get focused as high-density optical disks for using 650 nm wavelength visible light emitted from a semiconductor laser. The DVD disks are available in different formats including read only DVD-ROM, once writable DVD-R, and rewritable DVD-RAM. Also, compact disks (CD) are widely known using a 780 nm wavelength infrared light emitted from a semiconductor laser. Similar to the DVD, the CD disks are available in different formats including read only CD-ROM, once rewritable CD-R, and multiply rewritable CD-RW.

As both DVD and CD are popular, it is desired for the convenience of any user to play back data from not only DVD-ROM and CD-ROM, but also DVD-R and CD-R with the use of a single data playback apparatus.

The CD-R and DVD-R technologies are similar to each other in storage and playing back data on the basis of different levels of the reflectivity of colors. However, the reflectivity and the absorptance are optimized in narrow wavelength ranges about 780 nm and 650 nm, respectively. This disallows CD-R data to be read and played back using the 650 nm wavelength light beam. Also, DVD-R data is hardly permitted to be read and played back using the 780 nm wavelength light beam. For compensation, each CD-R/DVD-R compatible type data record/playback apparatus has an optical pickup head equipped with a DVD-R accessible semiconductor laser and a CD-R accessible semiconductor laser.

For minimizing the overall size and the production cost of the data record/playback apparatus, the optical pickup head should be decreased in the size and the cost. One of such techniques is proposed for integrating the above described two different wavelength semiconductor lasers into a single package to simplify the optical system of the optical pickup head, FIG. 16 illustrates an arrangement of a conventional optical pickup head apparatus 1600 such as disclosed in Japanese Patent Laid-open Publication (Heisei)10-289468. The optical pickup head apparatus 1600 has a light source 110 and a light source 120 both provided on a substrate 610 in a package 60 for emitting a beam of linearly polarized divergent light having a wavelength of 650 nm and a beam of linearly polarized divergent light having a wavelength of 780 nm, respectively.

The principle of a method of reading data from a storage medium 20 with the optical pickup head 1600 will now be explained. A light beam 100 emitted from the light source 110 or 120 is first directed to a beam composite means 30 which may be implemented by a polarizing prism (a birefringent plate) or a hologram. The beam composite means 30 aligns any light beam from either the light source 110 or the light source 120 with the optical axis. When the light beam 100 is received from the light source 120, it is refracted or diffracted by the beam composite means 30 for deflection. The light beam 100 is then converted to a collimate light by a collimate lens 131, circularly polarized by a ¼ wavelength plate 140, passed through an aperture 15, and converted to a beam of convergence light by an objective lens 132. The light beam 100 is directed to the optical storage medium 20 and more specifically, passed through a transparent substrate 21 and focused on a data recording surface 22. The light beam 100 is reflected on the data recording surface 22, converted by the ¼ wavelength plate 140 to a polarized beam shifted 90 degrees from the onward beam, passed through the beam composite means 30, and received by deflecting means 40 (a polarizing hologram) before guided to a photo detecting means 50. A signal produced by the photo detecting means 50 is used as a data signal indicative of the data for generating a focusing error signal and a tracking error signal which are then supplied to an actuator 16 for focusing and tracking control.

It is common in the data record/playback apparatus for rewritable disks such as DVD-RAM that the tracking control signal is unstable because of shallow pits of the disks. For compensation, a diffraction grating (not shown) is provided for generating three different diffracted lights to determine the focusing error signal and the tracking error signal.

As the conventional optical pickup head apparatus 1600 includes the beam composite means 30 of a polarizing prism or hologram and the ¼ wavelength plate 140 for handling the polarized light, its optical system will significantly increase in the cost.

When the transparent substrate 21 of the optical storage medium 20 is birefringent, the light beam reflected on the optical storage medium 20 may be deflected by the beam composite means 30 and hardly received by the photo detecting means 50 which thus fails to read data from the optical storage medium 20.

Also, while the two light sources 110 and 120 are provided on the single substrate 610, there may be less a room for the diffraction grating which is arranged for generating three different diffracted lights and should be controlled properly. The overall dimensions of the optical pickup head apparatus itself will be increased.

SUMMARY OF THE INVENTION

It is, hence, an object of the present invention to provide a semiconductor light source package, an optical pickup head apparatus, and an optical data apparatus where a non-polarizing prism is used for minimizing the number of components and thus the overall cost. It is another object of the present invention to provide an optical pickup head apparatus and an optical data apparatus where desired data can be read out from an optical storage medium 20 while the tracking error signal is appropriately produced, even though the transparent substrate of the optical storage medium is birefringent.

A light source package according to the present invention comprises: a first light source which emits a first light beam; a second light source which emits a second light beam which is different from the first light beam; and a deflection arrangement which deflects the first and second light beams and releases the deflected light beam as a third light beam, wherein the deflection arrangement includes a first deflector which deflects the first light beam and a second deflector which deflects the second light beam such that the optical axis of the first deflected light beam from the first deflector and the optical axis of the second deflected light beam from the second deflector substantially coincide.

An optical pickup head apparatus according to one aspect of the present invention comprises: a first light source which emits a first light beam having a wavelength $\lambda 1$; a second light source which emits a second light beam having a wavelength $\lambda 2$ which is different from the wavelength $\lambda 1$; a diffractor which generates a plurality of light beams from the light beam emitted from the light source; a light converging unit which converges the plurality of light beams received from the diffractor on an optical storage medium; a beam splitter which deflects the plurality of light beams converged and reflected on the optical storage medium; and a photodetector which receives deflected light beams from the beam splitter and outputs a signal relative to intensity of the deflected light beam, wherein the diffractor includes a first pattern and a second pattern provided at an angle to each other, the first pattern having a higher diffraction efficiency of a beam having a wavelength $\lambda 1$ than that having a wavelength $\lambda 2$ and the second pattern having a higher diffraction efficiency of a beam having a wavelength $\lambda 2$ than that having a wavelength $\lambda 1$.

An optical pickup head apparatus according to another aspect of the present invention comprises a beam splitter which deflects a light beam converged and reflected on a optical storage medium; and a photodetector which generates and releases a signal indicative of the intensity of each of the deflected light beams received from the beam splitter, wherein the beam splitter is a holographic optical element including a first holographic pattern and a, second holographic pattern, the first holographic pattern having a higher diffraction efficiency of a beam having a wavelength $\lambda 1$ than that having a wavelength $\lambda 2$ and the second holographic pattern having a higher diffraction efficiency of a beam having a wavelength (2 than that having a wavelength $\lambda 1$.

Also, a data record/playback apparatus of the present invention may be provided, which comprises: one of optical pickup head apparatuses according to the present invention; a drive which varies the position of the optical pickup head apparatus relative to a data storage medium; and an electric signal processor responsive to a signal received from the optical pickup head apparatus which performs an arithmetic operation to reconstruct a desired data. Accordingly, an optical data apparatus can be implemented which allows the intensity of each light received by its photodetector to remain unchanged when an optical storage medium to be played back is partially birefringent, hence ensuring improved playback of data.

Also, during the assembling of the optical pickup head apparatus, the diffraction grating is adjustably positioned to match one of any two formats, CD and DVD, of the optical storage medium while its adjustment for the other format is automatically done at the same time. As a result, the optical pickup head apparatus will be highly improved in the productivity.

BRIEF DESCRIPTION OF THE DRAWINGS

These and other object and features of the present invention will become clear from the following description taken in conjunction with the preferred embodiments thereof with reference to the accompanying drawings, in which.

DETAILED DESCRIPTION OF THE PREFERRED EMBODIMENTS

Embodiments 1 to 8 of the present invention will be described referring to the accompanying drawings. Like components are denoted by like numerals throughout the drawings.

Embodiment 1

This embodiment incorporates a semiconductor light source package having a prism with a first and second reflecting surface. The prism is arranged such that the optical axis for a first wavelength light beam reflected on the first reflecting surface substantially coincides with the optical axis for a second wavelength light beam reflected on the second reflecting surface.

Figure 1:
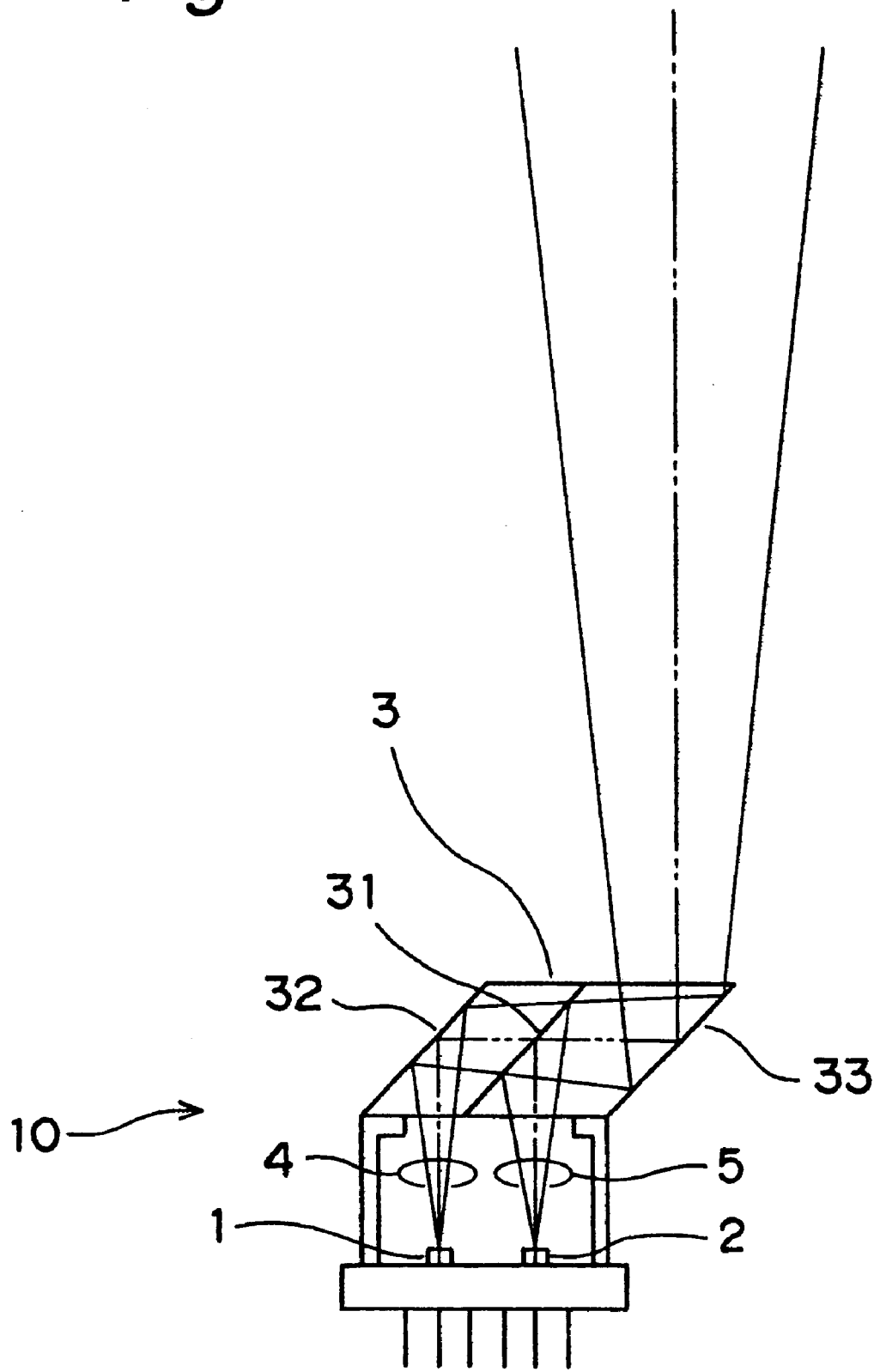
FIG. 1 is a diagram of an arrangement of a semiconductor light source package according to Embodiment 1 of the present invention.

FIG. 1 illustrates an arrangement of the semiconductor light source package 10 of Embodiment 1. The semiconductor light source package 10 comprises a semiconductor laser light source 1 for a laser beam of a wavelength λ1, another semiconductor laser light source 2 for a laser beam of a wavelength λ2, and a prism 3. The semiconductor laser light source 1 emits a linearly polarized divergent light beam 4 having the wavelength λ1 for reading out data from an optical storage medium of DVD format such as DVD-R. It is assumed in this specification that the wavelength λ1 is 650 nm. Similarly, the semiconductor laser light source 2 emits a linearly polarized divergent light beam 5 having the wavelength λ2 for reading out data from an optical storage medium of CD format such as CD-R. It is thus assumed that the wavelength λ2 is 780 nm. The two semiconductor laser light sources 1 and 2 are mounted in the single package 10.

The prism 3 has three reflecting surfaces 31, 32, and 33. The reflecting surface 31 is a dichroic mirror which is wavelength-selective and fully transmits a beam of the wavelength λ1 while reflecting a beam of the wavelength λ2. The reflecting surface 32 is a total reflection mirror which fully reflects a beam of the wavelength λ1. The reflecting surface 33 is a total reflection mirror which fully reflects beams of the wavelengths λ1 and λ2. The prism 3 is arranged for aligning the optical axis of a light beam having the wavelength λ1 reflected on the reflecting surface 32 substantially with the optical axis of a light beam having the wavelength λ2 reflected on the reflecting surface 31. As a result, two lights of the wavelengths λ1 and λ2 reflected on the reflecting surface 33 run substantially along the same optical axis.

The light beams reflected on the two reflecting surfaces 31 and 32 may be released out from the prism 3 before reflected on the reflecting surface 33. In that case, the outgoing lights from the prism 3 are shifted 90 degrees clockwise from the outgoing direction shown in FIG. 1. The outgoing direction of light from the prism 3 may be arbitrarily determined by adjusting the position of the semiconductor light source package 10. Embodiment 7 incorporates an optical pickup head apparatus using the prism 3 as will be described later.

Figure 2:
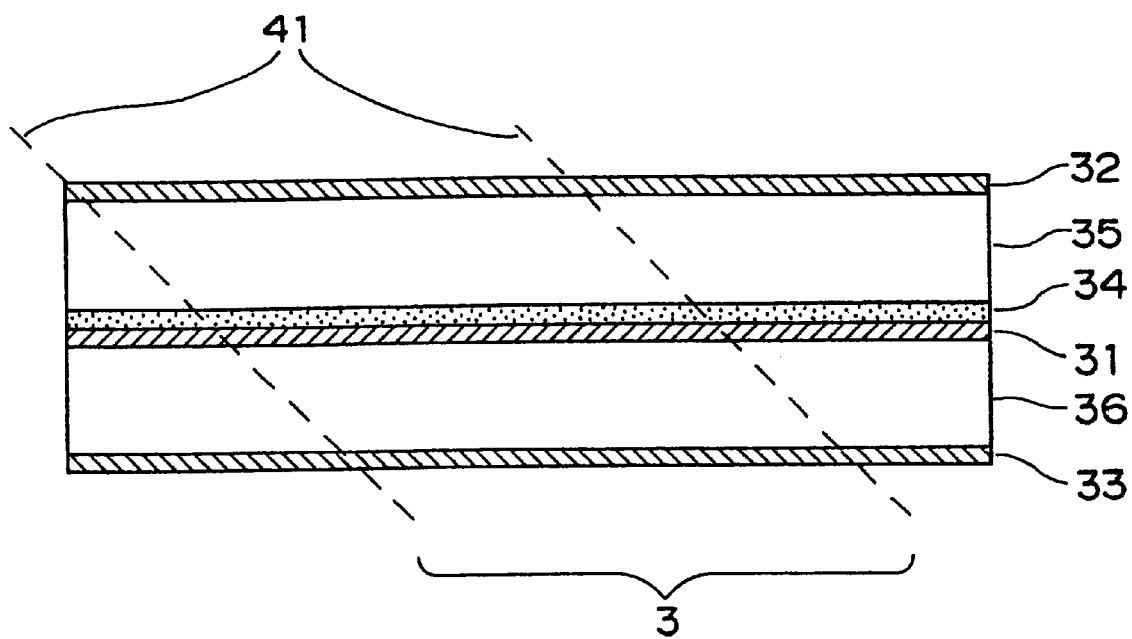
FIG. 2 is a schematic diagram of a prism in Embodiment 1.

FIG. 2 illustrates the prism 3. The prism 3 comprises two glass substrates 35 and 36. The total reflecting surface 33 and the dichroic surface 31 are provided by vacuum vapor deposition on the lower and upper sides of the glass substrate 36, respectively, while the total reflecting surface 32 is provided by the same technique on the upper side of the glass substrate 35. The reflecting surfaces 32 and 33 consist of metal films while the dichroic surfaces 31 is a multi-layer dielectric. The two glass substrates 35 and 36 having the reflecting surfaces 31 to 33 are bonded at an interface 34 to each other. The two bonded glass substrates are then cut along the lines 41 to form a unit of the prism 3. In brief, the prism 3 is made from two plane-parallel glass plates. The prism 3, is hence, lower in the cost than any conventional prism fabricated by polishing, thus contributing to the cost reduction of the semiconductor light source package 10.

As the light beam is deflected by the prism 3, its direction will hardly be displaced when the wavelength is changed and its light source will be improved in operational reliability.

Also, as the semiconductor light source package 10 allows the two light beams 4 and 5 from the prism 3 to run along the same optical axis, the two light sources can be identified as a single light source. Accordingly, when the semiconductor light source package 10 is installed in an optical pickup head apparatus, the adjustment over the light sources will be as highly simplified as with the single light source.

Moreover, the semiconductor light source package 10 is compatible with a multi-color laser pointer.

Embodiment 2

Figure 16:
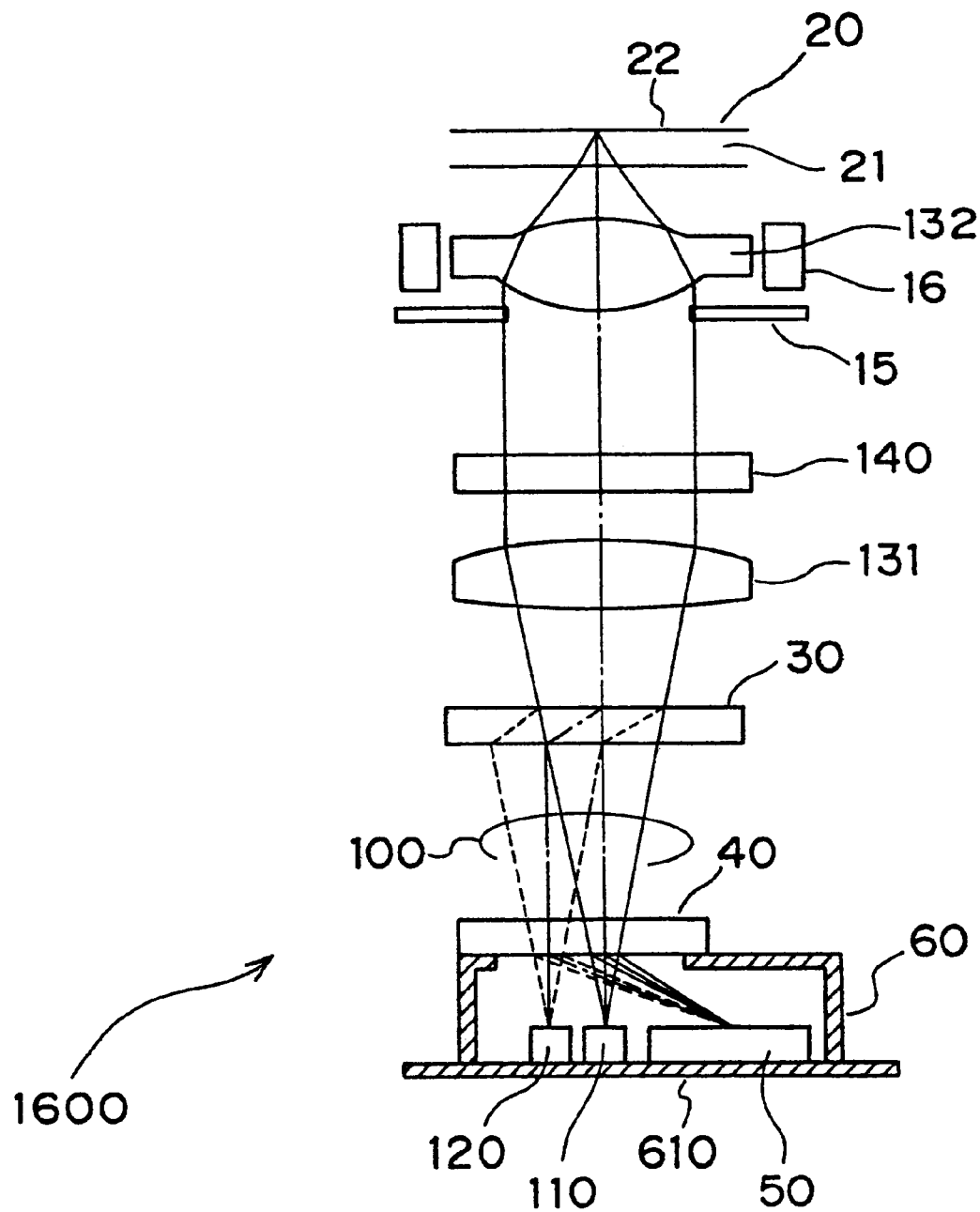
FIG. 16 is a schematic diagram of a conventional optical pickup head apparatus.

This embodiment is in the form of an optical pickup head apparatus with no use of the ¼ wavelength plate 140 (FIG. 16).

Figure 3:
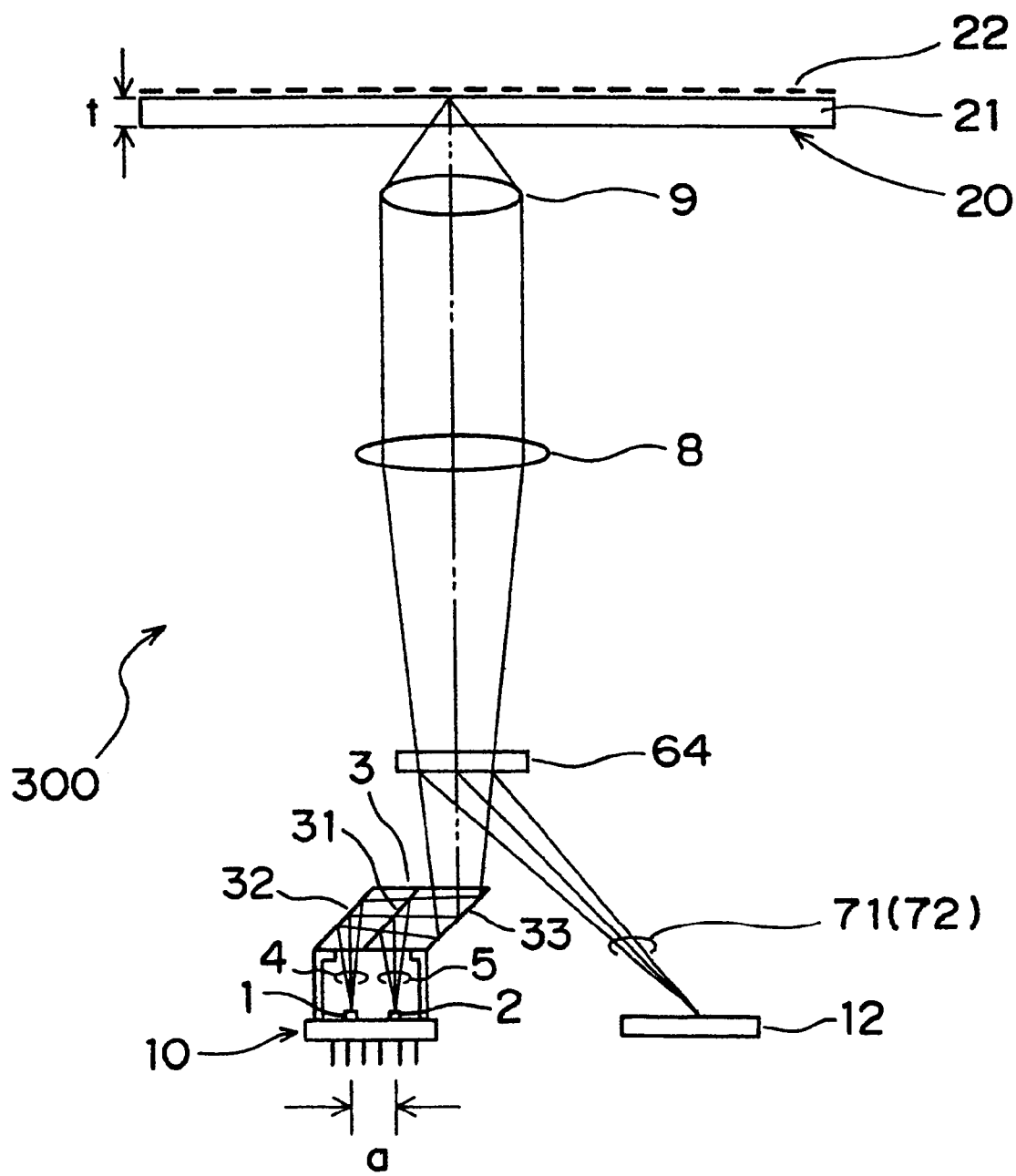
FIG. 3 is a diagram of an arrangement of an optical pickup head apparatus according to Embodiment 2 of the present invention.

FIG. 3 illustrates an arrangement of the optical pickup head apparatus 300 of Embodiment 2. The optical pickup head apparatus 300 comprises a semiconductor light source package 10, a holographic optical element 64, a collimate lens 8, an objective lens 9, and a photodetector 12.

While the positional relationship between the two semiconductor laser light sources 1 and 2 in the semiconductor light source package 10 is not a concern in Embodiment 1, the distance between the two semiconductor laser light sources 1 and 2 in this embodiment is 2 mm, for example. As the light source 2 is positioned closer to the collimate lens 8 than the light source 1, any spherical aberration caused by a difference in the thickness of the substrate 21 between the optical storage mediums 20 can be corrected. The refractivity of the prism 3 is 1.51, for example.

The operation of the optical pickup head apparatus 300 reading out data from the optical storage medium 20 will now be explained. The optical pickup head apparatus 300 initiates the irradiation of one of the two semiconductor laser light sources 1 or 2 in accordance with the type of the optical storage medium 20. When the optical storage medium 20 is a DVD, the semiconductor laser light source 1 emits the light beam 4. The light beam 4 is reflected on the reflecting surface 32 of the prism 3 as its optical path is turned and passed through the dichroic surface 31. On the other hand, when the optical storage medium 20 is a CD, the semiconductor laser light source 2 emits the light beam 5. The light beam 5 is received by the prism 3 where it is reflected on the dichroic surface 31. Thus, the light beam 5 substantially coincides with the optical axis of the light beam 4 transmitted through the reflecting surface 31. Each of the two light beams 4 and 5 is then reflected on the reflecting surface 33 as its optical path is deflected and converted to a collimate light by the collimate lens 8 having a focusing distance of 20 mm. The collimated light 4 or 5 is converged by the objective lens 9 having a focusing distance of 3 mm, passed through the transparent substrate 21 of the optical storage medium 20, and focused on the data recording surface 22. The thickness t of the transparent substrate is 1.2 mm in the CD format and 0.6 mm in the DVD format.

The light beam 4 or 5 is reflected on the data recording surface 22 of the optical storage medium 20. The light beam 4 or 5 is then passed through the objective lens 9 and the collimate lens 8 and transmitted to the holographic optical element 64 where it is converted to a diffracted light 71 or 72 which is then received by the photodetector 12.

Figure 4:
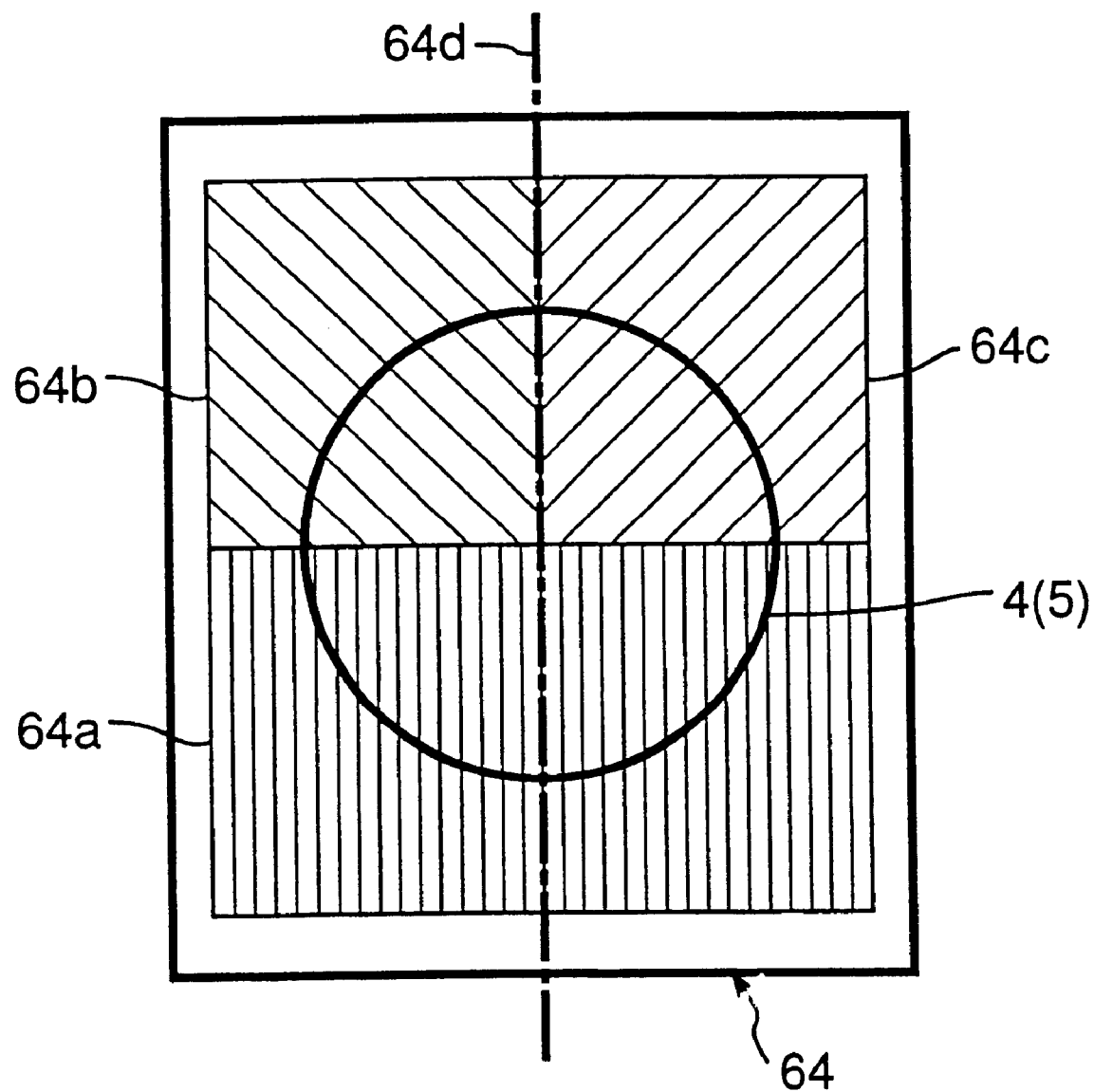
FIG. 4 is a schematic diagram of a holographic optical element in Embodiment 2.

FIG. 4 illustrates an arrangement of the holographic optical element 64. The holographic optical element 64 has three regions 64a to 64c. The light beam 4 or 5 entering the holographic optical element 64 is diffracted by the regions 64a to 64c. An axis 64d extends in parallel with a separation line between the two regions 64b and 64c and is arranged such that it can be in parallel with the track on the data recording surface when projected with the light beam 4 or 5.

Figure 5:
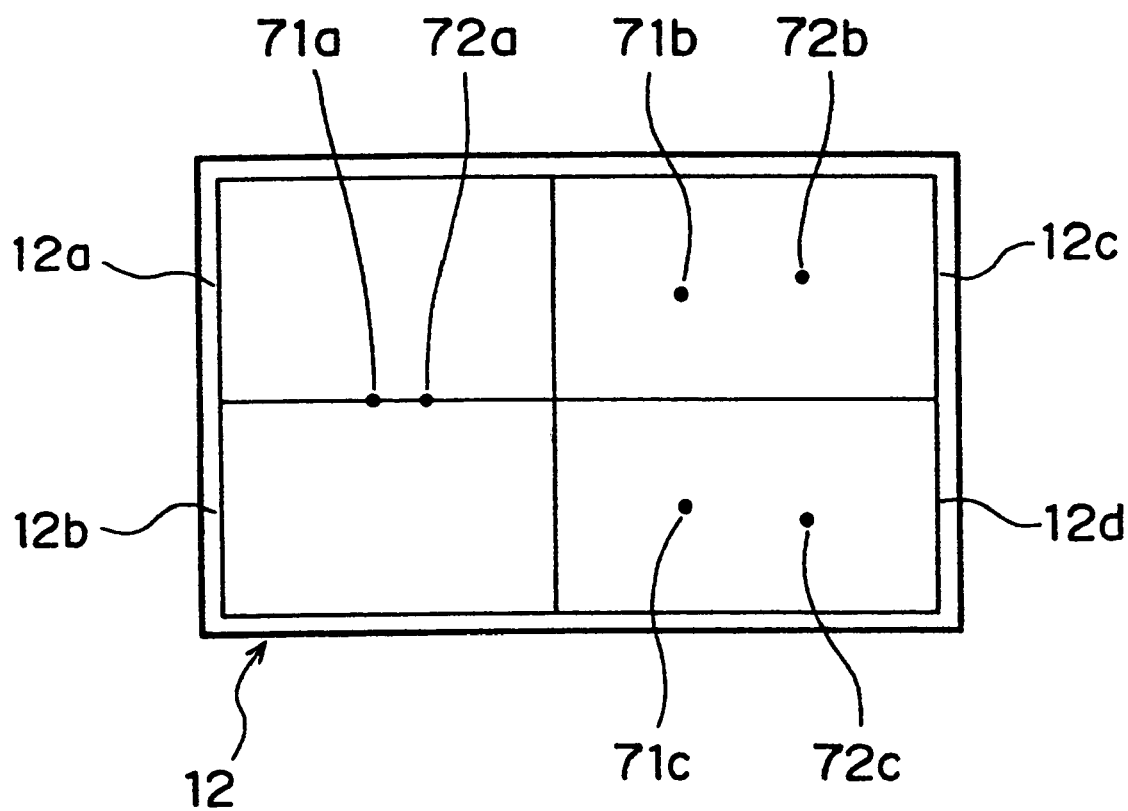
FIG. 5 is a schematic diagram of elements of a photodetector in Embodiment 2.

FIG. 5 shows a light receiving side of the photodetector 12. The light receiving side of the photodetector 12 comprises four elements 12a to 12d. The elements 12a to 12d receive the diffracted lights 71a to 71c and 72a to 72c. The diffracted lights 71a and 72a, 71b and 72b, and 71c and 72c are generated by their respective regions 64a, 64b, and 64c of the holographic optical element 64 (FIG. 4).

As signal outputs I12a to I12d of the elements 12a to 12d are produced based on the intensities of the incident light, the focusing error signal can be calculated as I12a–I12b by Foucault method. Similarly, the tracking error signal can be obtained by differential phase detection method of comparing the phases of I12a and I12c. The detection methods of those signals are well-known and will be explained in no more detail.

The optical pickup head apparatus of this embodiment permits the intensity of each light received by the photodetector to remain unchanged even if the optical storage medium carries birefringent factors and can thus be improved in the performance of data playback.

In this embodiment, the reflecting surface 31 is a dichroic mirror for increasing the efficiency of light transmission. When the intensity of incident light is sufficient, the reflecting surface 31 may be implemented by a half-mirror which is not wavelength-selective. Also, a wavelength-selective aperture filter may be provided between the collimate lens 8 and the objective lens 9 for limiting the aperture for the wavelength of 780 nm. The objective lens 9 may be a specific lens having different curvatures partially to realize the adequate aberration for DVD and CD. The optical pickup head apparatus 300 (FIG. 3) may further be reduced in overall dimensions when the photodetector and the light sources are formed in a single unit.

Embodiment 3

This embodiment incorporates an optical pickup head apparatus which employs a holographic optical element for aligning the diffracted lights from different light sources with each other on a photodetector.

Figure 6:
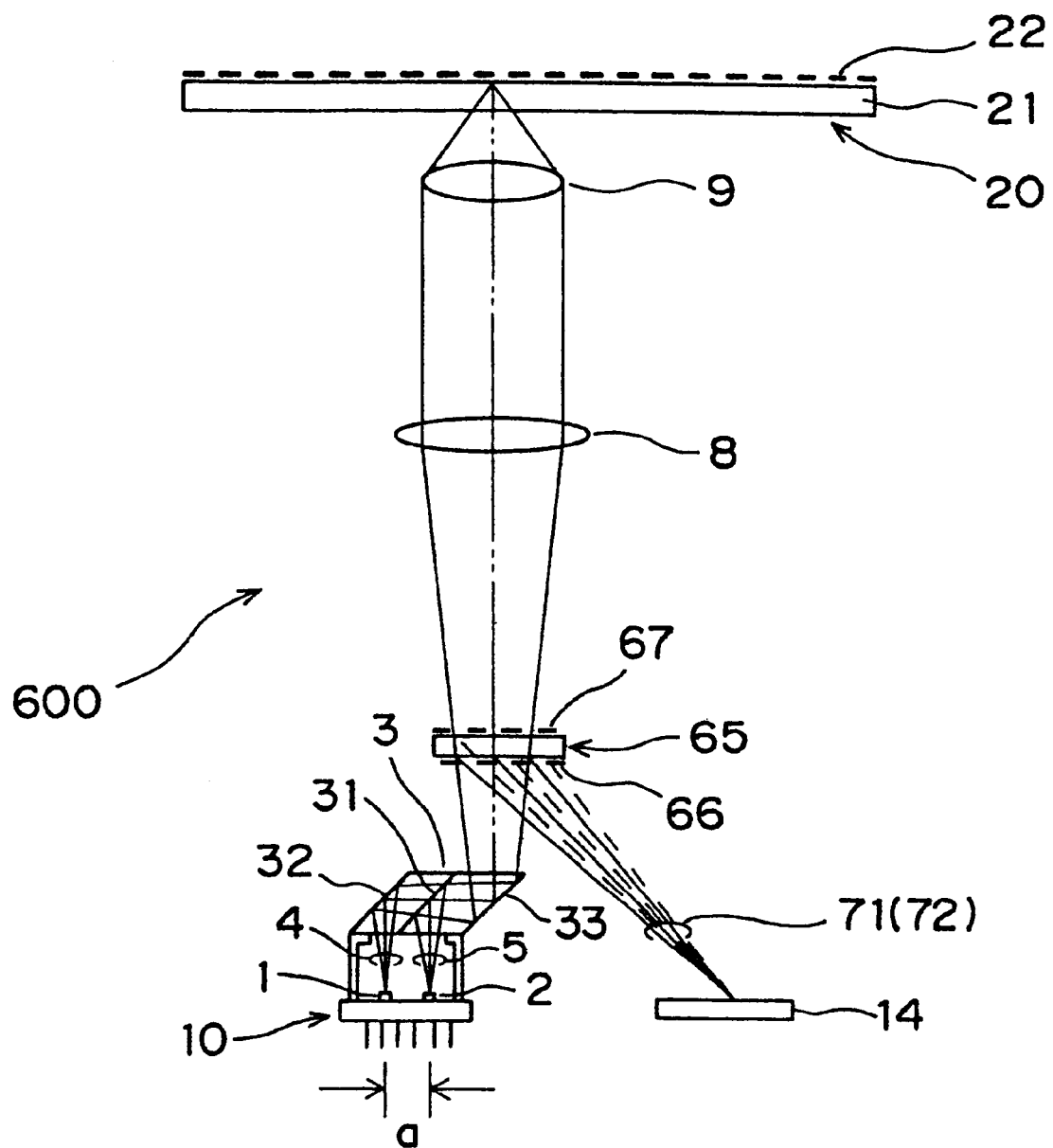
FIG. 6 is a diagram of an arrangement of an optical pickup head apparatus according to Embodiment 3 of the present invention.

FIG. 6 illustrates an arrangement of the optical pickup head apparatus 600 of Embodiment 3. This apparatus is differentiated from the optical pickup head apparatus 300 (FIG. 3) of Embodiment 2 by the fact that the holographic optical element 64 (FIG. 3) is replaced by another holographic optical element 65 while the photodetector 12 is replaced by another photodetector 14. The other components are identical to those of the optical pickup head apparatus 300 (FIG. 3) and will be explained in no more detail.

Figure 7:
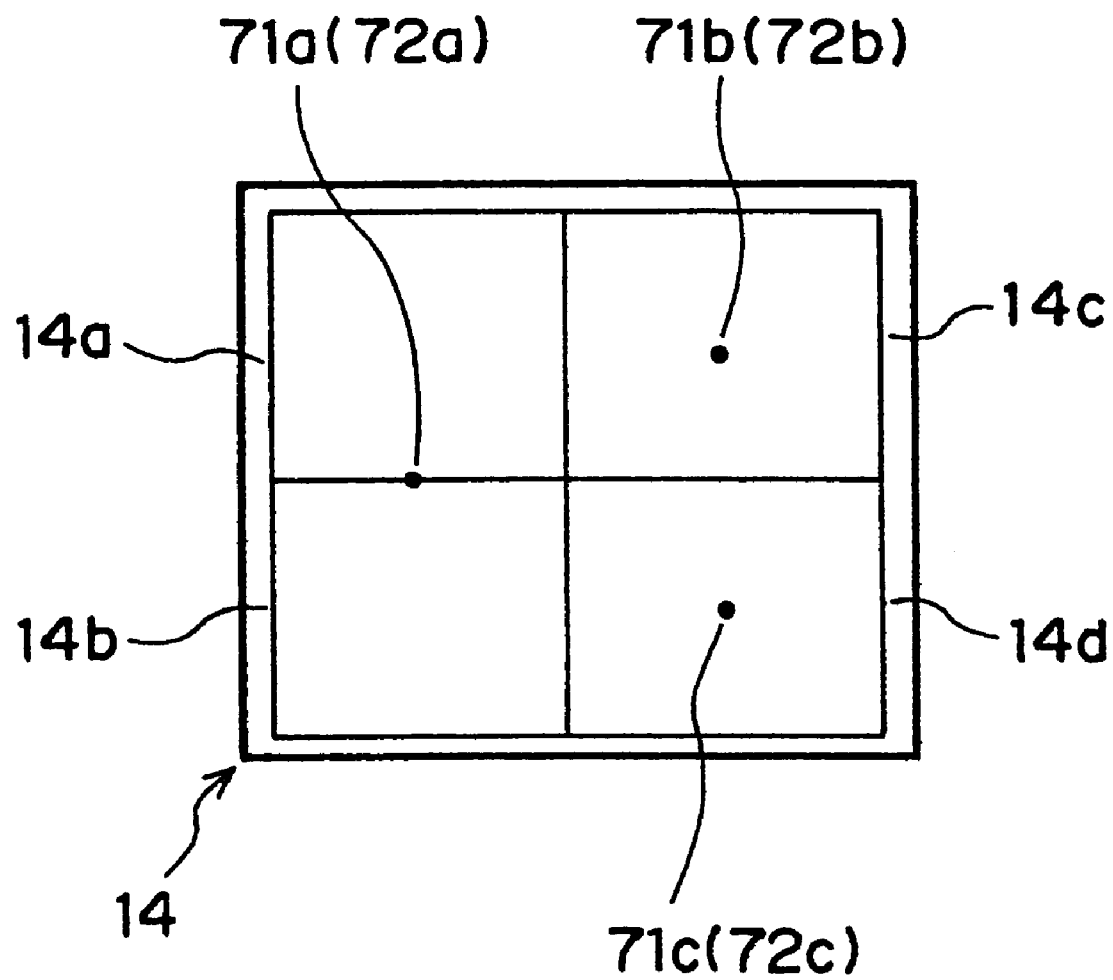
FIG. 7 is a schematic diagram of elements 14a to 14d of a photodetector 14 in Embodiment 3 where a group of diffracted lights 71a to 71c are aligned with another group of diffracted lights 72a to 72c.

The holographic optical element 65 comprises a couple of patterns 66 and 67 provided on the upper and lower sides of a single substrate. The pattern 66 generates a diffracted light 71. The pattern 67 generates a diffracted light 72. FIG. 7 shows four elements 14a to 14d of the photodetector 14 where a group of diffracted lights 71a to 71c are aligned with another group of diffracted lights 72a to 72c, respectively. The grating pitch and the spatial frequency axis of the holographic optical element 65 (FIG. 6) are selectively determined such that the diffracted lights 71 and 72 are aligned with each other on the photodetector 14. The characteristics of the patterns 66 and 67 (FIG. 6) are substantially equal to those of the regions 64a to 64c (FIG. 4).

Returning back to FIG. 6, the pattern 66 generates the diffracted light from a light beam having the wavelength $\lambda 1$ emitted from the light source 1 but no diffracted light from a light beam having the wavelength $\lambda 2$ emitted from the light source 2. In other words, the pattern 66 has a higher level of diffraction efficiency for the wavelength $\lambda 1$ than for the wavelength $\lambda 2$. This can be implemented by optically increasing the grating depth to an integer multiple of $\lambda 2$. As a result, the amount of stray light can be minimized, thus improving the efficiency of use of light. Similarly, the pattern 67 generates the diffracted light from the light beam having the wavelength $\lambda 2$ emitted from the light source 2 but no diffracted light from the light beam having the wavelength $\lambda 1$ emitted from the light source 1. The pattern 67 has a higher level of diffraction efficiency for the wavelength 2 than for the wavelength $\lambda 1$. This can be implemented by optically increasing the grating depth to an integer multiple of $\lambda 1$.

The photodetector 14 is smaller in size than the photodetector 12 (FIG. 3). This is realized by the two diffracted lights 71 and 72 aligned with each other and thus the four elements 14a to 14d are minimized in dimensions. As the optical pickup head apparatus 600 of this embodiment is favorably reduced in overall dimensions with its elements minimized in size, it can be applicable to any data playback apparatus which requires a minimum of the size and a higher speed of the operation.

While the focusing error signal is obtained by well-known Foucault method in this embodiment, it may be determined by any other appropriate manner such as spot size detection. The photodetector 14 may be arranged for receiving conjugate lights 71 and 72 from the holographic optical element 65. This will double the efficiency of use of light, hence contributing to the higher signal-to-noise ratio of the optical pickup head apparatus.

As the two patterns 66 and 67 are provided in a combination, the photodetector 14 can be controlled to a desired size and located to a desired position. Even if the optical pickup head apparatus is limited in the external configuration, the freedom of designing its optical system will be large enough to satisfy the requirements of any application such as a vehicle-mounted or portable model.

Embodiment 4

This embodiment is in the form of an optical pickup head apparatus which employs a specific holographic optical element, similar to that of Embodiment 3, for aligning the diffracted lights from different light sources with each other on a photodetector.

Figure 8:
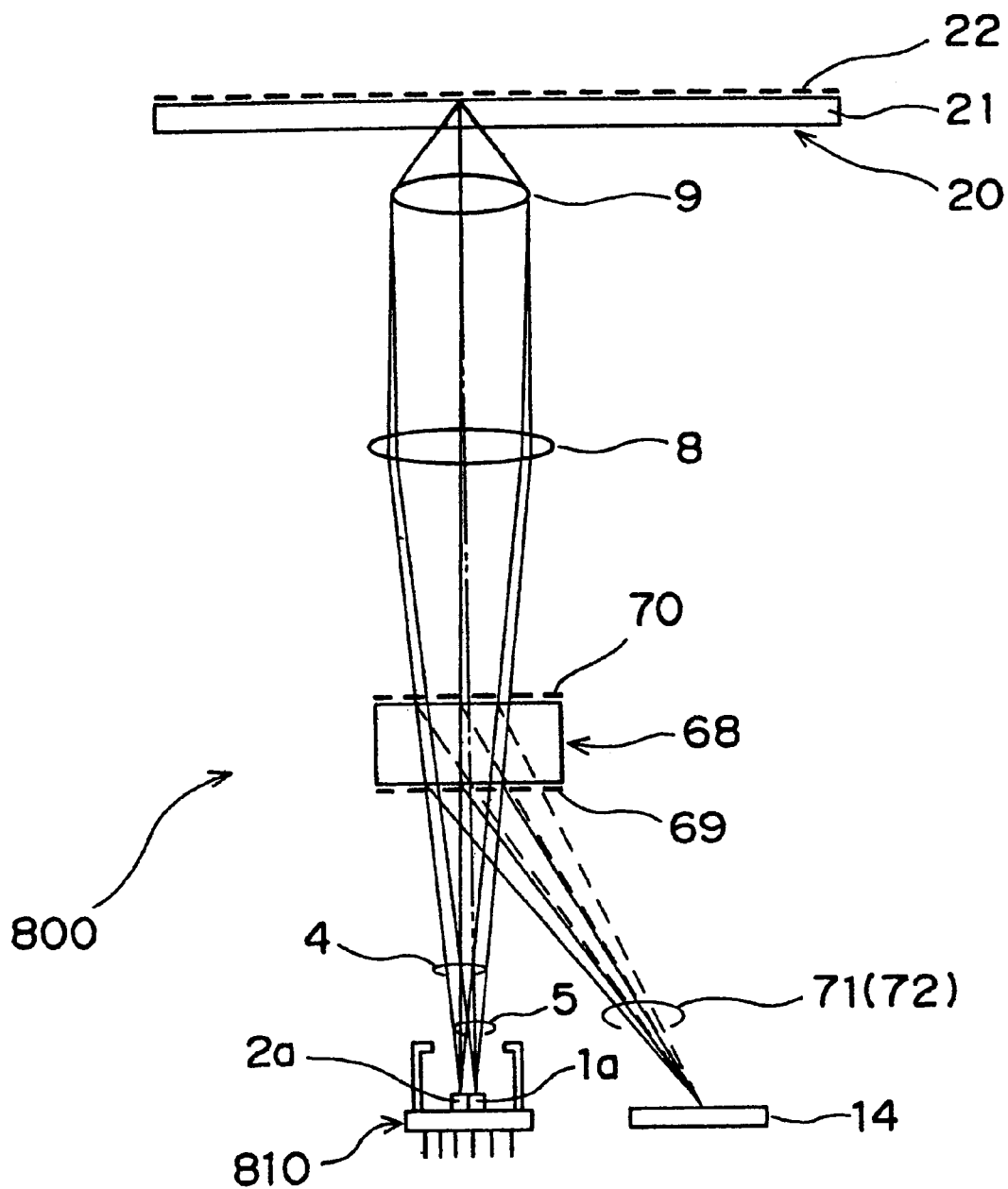
FIG. 8 is a diagram of an arrangement of an optical pickup head apparatus according to Embodiment 4 of the present invention.

FIG. 8 illustrates an arrangement of the optical pickup head apparatus 800 of embodiment 4. This apparatus is differentiated from the optical pickup head apparatus 600 of Embodiment 3 (FIG. 6) by the fact that the holographic optical element 65 (FIG. 6) is replaced by another holographic optical element 68 while the two light sources 1 and 2 (FIG. 3) are replaced by a pair of light sources 1a and 2a which are assembled in a semiconductor light source package 810. The other components are identical to those of the optical pickup head apparatus 600 (FIG. 6) and will be explained in no more detail.

The two light sources 1a and 2a are monolithic semiconductor lasers mounted on a single semiconductor substrate for emitting light beams having a wavelength of 780 nm and a wavelength of 650 nm, respectively. The distance between the two lasers is 100 $\mu$m, for example. The holographic optical element 68 like the holographic optical element 65 (FIG. 6) comprises a couple of patterns 69 and 70. The pattern 69 generates a diffracted light 71. The pattern 70 generates a diffracted light 72. Similarly, the grating pitch and the spatial frequency axis of the hologram 68 are selectively determined such that the diffracted lights 71 and 72 from their respective patterns 69 and 70 are aligned with each other on the photodetector 14 as shown in FIG. 7.

While the two light sources are spaced from each other, their two diffracted lights can successfully be aligned with each other on the photodetector 14. This allows the optical pickup head apparatus of this embodiment to be minimized in overall dimensions. Also, as the light sources are associated with no prism, the optical pickup head apparatus will be lower in production cost.

Embodiment 5

This embodiment incorporates a diffraction grating which has a pair of grating patterns arranged where when its position is determined relative to one of two storage mediums such that two or more diffracted lights fall in a desired positional relationship, its position relative to the other storage medium can automatically be set.

Figure 9:
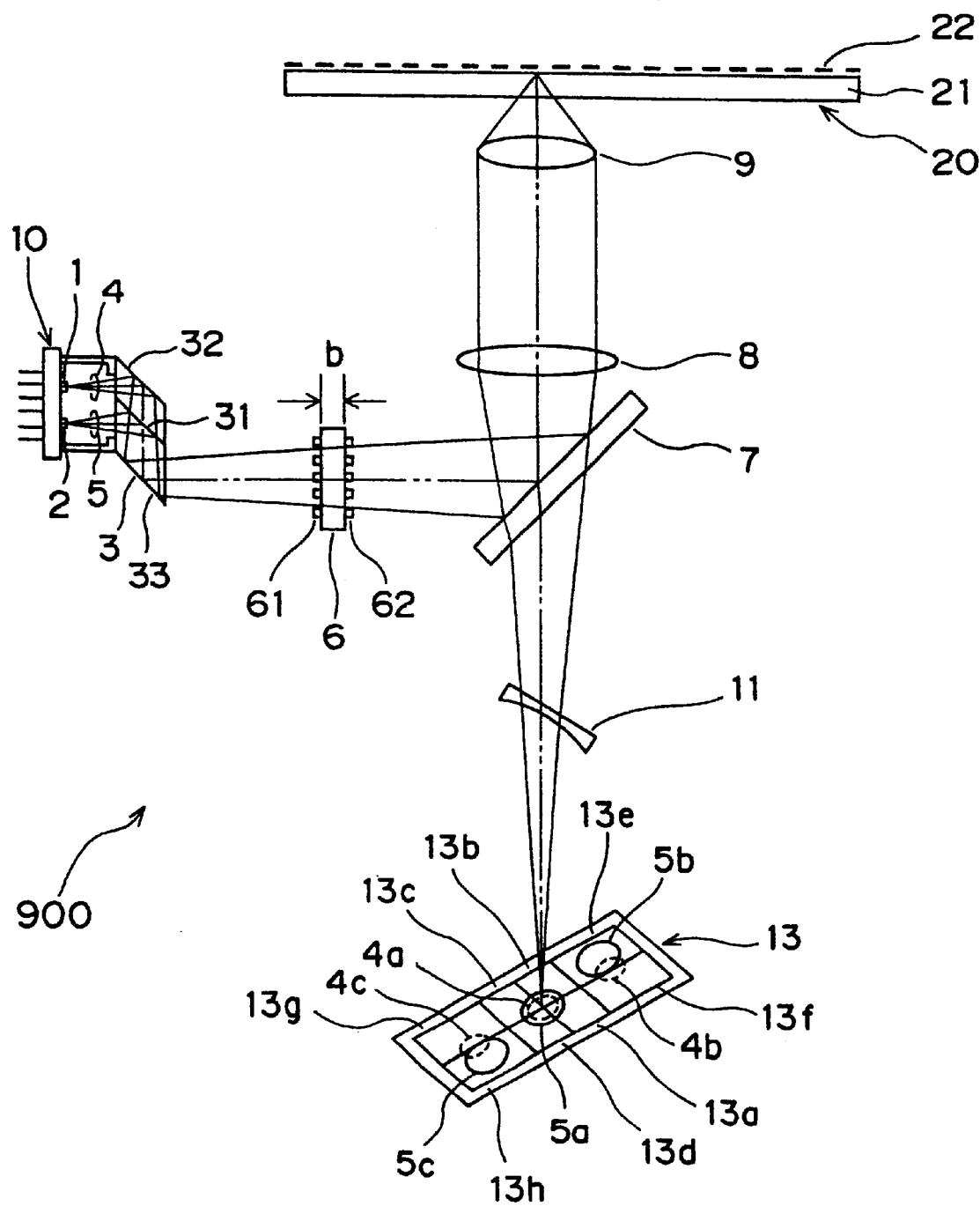
FIG. 9 is a diagram of an arrangement of an optical pickup head apparatus according to Embodiment 5 of the present invention.

FIG. 9 illustrates an optical pickup head apparatus 900 of Embodiment 5. This apparatus is differentiated from the optical pickup head apparatus 300 (FIG. 3) of Embodiment 2 by the fact that the holographic optical element 64 and the photodetector 12 (FIG. 3) are replaced by a half-mirror 7 and another photodetector 13, respectively, while a diffraction grating 6 is set between the prism 3 and the half-mirror 7, and while a concave lens 11 is provided between the half-mirror 7 and the photodetector 13.

The diffraction grating 6 comprises a couple of grating surfaces 61 and 62. The distance from the light source 2 to the grating surface 61 is 10 mm, for example. In operation, a light beam 4 or 5 is passed through the prism 3 and received by the diffraction grating 6. The light beam 4 or 5 from the diffraction grating 6 is expressed as three beams 4a to 4c or 5a to 5c. The three beams are reflected on the half-mirror 7, converted into a converged light by the objective lens 9, and focused on the data recording surface 22 of an optical storage medium 20. The light beam 4 or 5 is then reflected on the data recording surface 22, passed back through the objective lens 9 and the collimate lens 8, and transmitted through the half-mirror 7. As the light beam 4 or 5 is transmitted through the half-mirror 7, it is astigmatized before being passed through the concave lens 11 tilted from the optical axis. This allows coma aberration provided by the half-mirror 7 to be eliminated. The light beam 4 or 5 is finally received by the photodetector 13 as three beam components 4a to 4c or 5a to 5c which are then used for producing the focusing error signal and the tracking error signal as will be explained later.

The relationship between the optical storage medium 20, the light beams 4a to 4c or 5a to 5c, and the diffraction grating 6 is now explained.

Figure 10A:
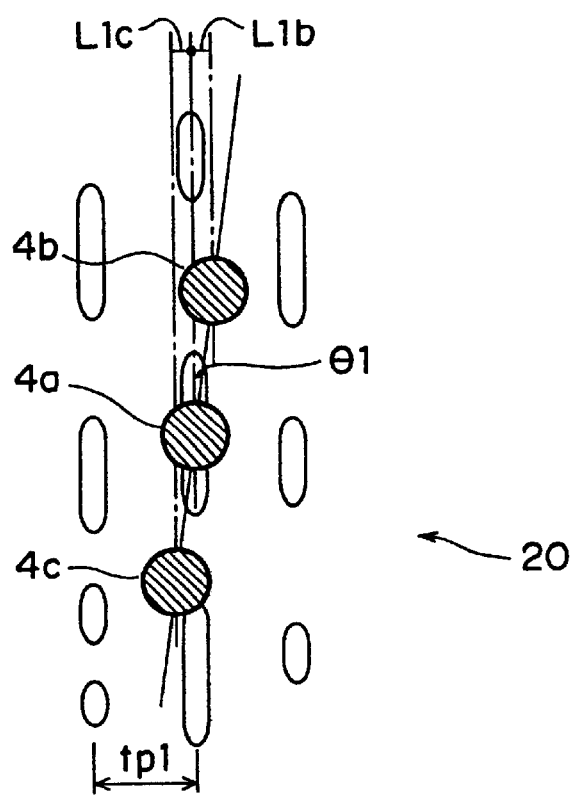
FIG. 10A is a schematic diagram of a group of beams 4a to 4c on the data recording surface of an optical storage medium.
Figure 10B:
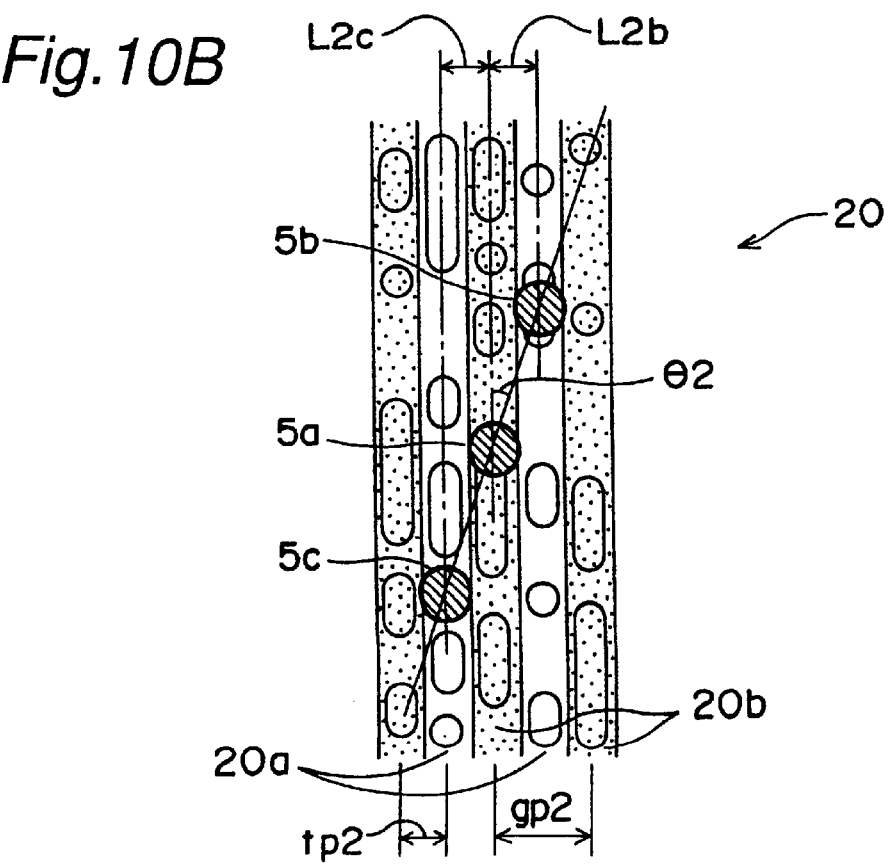
FIG. 10B is a schematic diagram of a group of beams 5a to 5c on the data recording surface of an optical storage medium.

FIGS. 10A and 10B show the relation between a group of beams 4a to 4c and tracks on the data recording surface 22 of an optical storage medium 20 and between another group of beams 5a to 5c and the tracks, respectively. As shown in FIG. 10A, the beams 4a to 4c are located along the track of the optical storage medium 20 of CD-ROM format. The CD-ROM carries a record in the form of a row of pits, each pit measuring 0.8 µm to 3.0 µm in length, 0.5 µm in width, and 0.1 µm in depth. The tracking pitch tp1 is 1.6 µm. The beams 4a to 4c are generated by the diffraction grating 6 and classified into a zero-order diffracted light 4a, a positive first-order diffracted light 4b, and a negative first-order diffracted light 4c. The angle between the line extending across the three beams 4a to 4c and the track is θ1. The displacement L1b of the beam 4b from the beam 4a along the tracking pitch is equal to tp1/4 or 0.4 µm. Similarly, the displacement L1c of the beam 4c from the beam 4a along the tracking pitch is equal to tp1/4 or 0.4 µm. The three diffracted lights can be controlled to hold their positional relationship by the diffraction grating 6 being turned. This technique is well-known as three-beam method for generating the tracking error signal.

FIG. 10B schematically shows the beams 5a to 5c focused on the track of the optical storage medium 20 of DVD-RAM format. The DVD-RAM carries a record in the form of a row of dark and light marks, each mark measuring 0.6 µm to 2.8 µm in length and 0.6 µm in width. The tracking pitch tp2 is 0.74 µm. The storage medium, unlike the DVD-ROM, has a guide groove which is 1.48 µm (=tp2×2) in the pitch gp2 and 0.07 µm in the depth. The dark and light marks are developed in and between the grooves. The beams 5a to 5c are generated by the diffraction grating 6 and classified into a zero-order diffracted light 5a, a positive first-order diffracted light 5b, and a negative first-order diffracted light 5c. The angle between the line extending across the three beams 5a to 5c and the track is θ2. The displacement L2b of the beam 5b from the beam 5a along the tracking pitch is also equal to tp2 (=gp2/2) or 0.74 (m. Similarly, the displacement L2c of the beam 5c from the beam 5a along the tracking pitch is equal to tp2 (=gp2/2) or 0.74 (m. This technique is well-known as differential push-pull method for generating the tracking error signal as will be explained later in more detail.

The angles θ1 and θ2 are determined based on a tilt of the grating patterns 61 and 62 of the diffraction grating 6 respectively being tilted as is explained below referring to FIG. 11. The diffraction grating 6 is controlled in the arrangement and position such that the angle between the diffracted lights and the track is duly maintained.

Figure 11A:
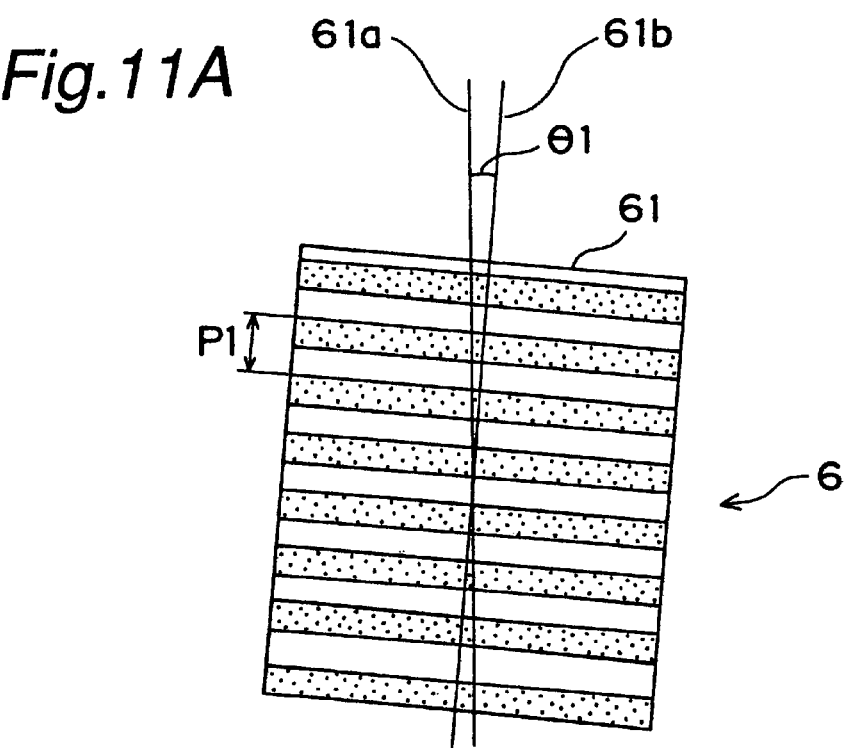
FIG. 11A is a schematic diagram of a grating pattern 61 of a diffraction grating 6.
Figure 11B:
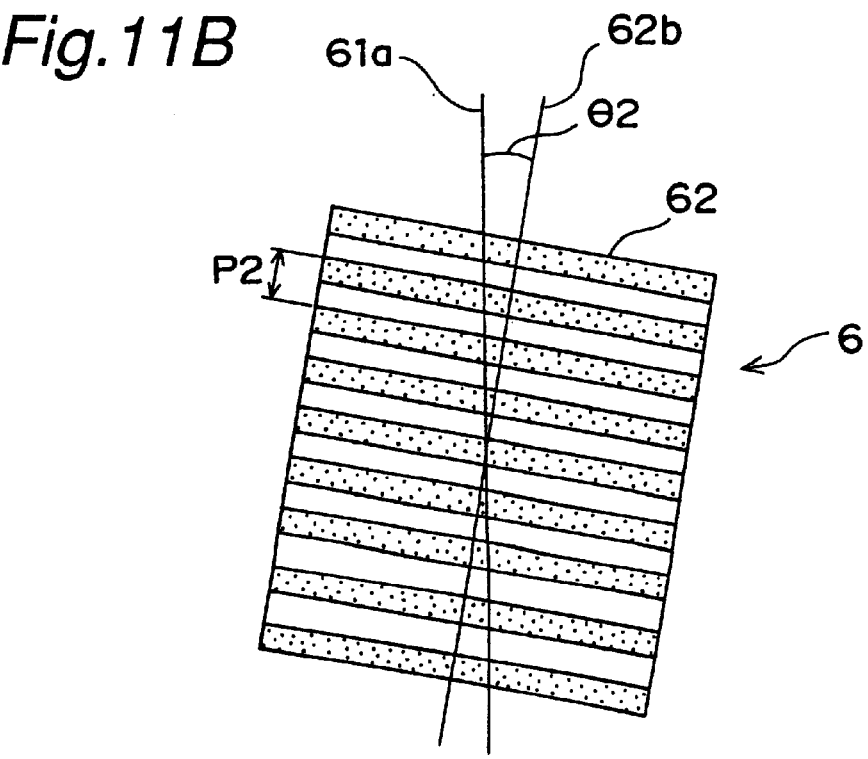
FIG. 11B is a schematic diagram of a grating pattern 62 of a diffraction grating 6.

FIGS. 11A and 11B illustrate the grating patterns 61 and 62 of the diffraction grating 6. FIG. 11A shows the grating pattern 61 and FIG. 11B shows the grating pattern 62. The diffraction grating 6 is made by molding a resin material which has a refractivity of 1.52. The distance b(FIG. 9) between the two grating patterns 61 and 62 is 1 mm. The grating patterns of the diffraction grating 6 are designed such that each set of the diffracted beams 4a, 4b, and 4c (FIG. 10A) and 5a, 5b, and 5c (FIG. 10B) are spaced at substantially equal intervals on the data recording surface of an optical storage medium 20. As the three beams are spaced at equal intervals, the elements of the photodetector 13 can be reduced in the size.

The grating pattern 61 shown in FIG. 11A is arranged with its grating depth of integral multiples of λ2 optically for generating no diffraction of a light beam having the wavelength λ2 while generating the diffracted lights from a light beam having the wavelength λ1. The grating pattern 62 shown in FIG. 11B is arranged with its grating depth of integral multiples of λ1 optically for generating no diffraction of the light beam having the wavelength λ1 while generating the diffracted lights from the light beam having the wavelength λ2. For example, the grating depths may be 2.3 µm and 1.9 µm, respectively. The pitches P1 and P2 of the gratings are 74 µm and 83 µm, respectively.

The axis 61a shown in FIGS. 11A and 11B is a reference axis for fabricating the diffraction grating 6. The diffraction grating 6 is designed such that the angle between the reference axis 61a and the spatial frequency axis 61b of the grating pattern 61 is θ1 and the angle between the reference axis 61a and the spatial frequency axis 62b of the grating pattern 62 is θ2. As the two grating patterns 61 and 62 of the diffraction grating 6 are fabricated at once, the relationship between the two angles θ1 and θ2 can always be maintained constant. As described with FIG. 10A, the angle θ1 is defined between the line extending across the beams 4a to 4c and the tracks on the data recording surface 22 of the optical storage medium 20. Similarly, as described with FIG. 10B, the angle θ2 is defined between the line extending across the beams 5a to 5c and the tracks. Accordingly, when the diffraction grating 6 is simply turned relative to one of the two storage mediums, CD and DVD, to position the three diffracted lights such that relationships between the displacements L1b and L1c (FIG. 10A) or between the displacements L2b and L2c (FIG. 10B) are satisfied, the positioning of the head to the other storage medium can be automatically completed. As a result, the process of adjusting the optical axis can be significantly simplified, thus contributing to the higher productivity of the optical pickup head apparatus. Also, as the diffraction grating 6 has two patterns on both sides thereof, its size can be equal to that of a conventional one pattern grating, hence allowing the optical pickup head apparatus including two light sources to be minimized in overall dimensions.

A method of producing the focusing error signal and the tracking error signal with the use of diffracted lights generated by the above manner will be explained. Referring back to FIG. 9, the photodetector 13 comprises eight elements 13a to 13h. The elements 13a to 13d accept the beams 4a and 5a, the elements 13e and 13f accept the beams 4b and 5b, and the elements 13g and 13h accept the beams 4c and 5c. The elements 13a to 13h, respectively, generate and output electric signals I13a to I13h relative to intensities of the received beam. For any type of the optical storage medium, the focusing error signal is obtained from the four signals I13a to I13d of their respective elements 13a to 13d by an astigmatic method as expressed (I13a+I13c)−(I13b+I13d).

The tracking error signal is calculated as (I13e+I13f)−(I13g+I13h) when the optical storage medium is a CD such as CD-ROM. On the other hand, the tracking error signal is obtained by using differential phase detection method when the optical storage medium is a DVD-ROM, and is calculated as (I13a+I13d)−(I13b+I13c)+k·{(I13e+I13g)−(I13f+I13h)} when the optical storage medium is a DVD-RAM, where value k is a coefficient for correcting the amplitude of the signal relative to the diffraction efficiency of the diffraction grating 6. When the storage medium is a DVD-RAM, the tracking error signal may be (I13a+I13d)−(I13b+I13c). As the objective lens is moved in response to the tracking action, an offset signal may occur. The offset signal can be subtracted by the above operation called differential push-pull method. The focusing error signal and the tracking error signal are produced in the above described manners.

While the angle θ2 is determined to match the DVD-RAM format in this embodiment, it may be controlled by varying the spatial frequency axis of the grating pattern 62 to have an optimum value of L1b and L1c (FIG. 10A) (for DVD-R, the optimum of L1b and L1c is 0.37 μm). In a data playback apparatus having light sources for different wavelengths of light or storage mediums of different types, the optical pickup head apparatus of this embodiment can be appropriated with an optical system modified to satisfy the optical requirements of the data playback apparatus. The optical system described above is an example and its angle between 61a and 61b or 62a and 62b may be arbitrarily designed while the grating pitch P1 or P2 is adjusted. The concave lens 11 may be eliminated depending on the optical requirements.

Embodiment 6

This embodiment is in the form of an optical pickup head apparatus which has a specific diffraction grating arranged to inhibit significant declination of the tracking error signal.

Figure 12:
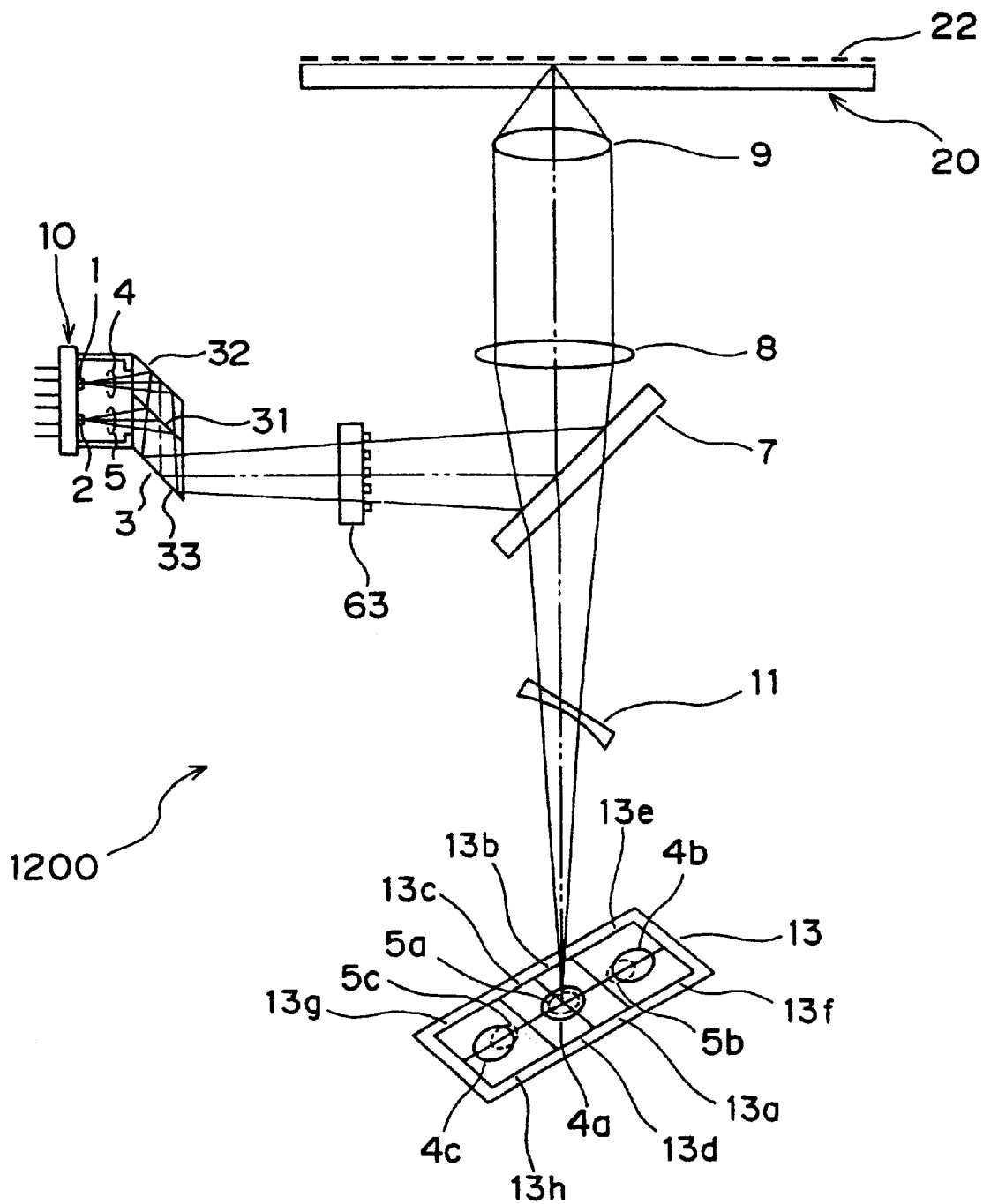
FIG. 12 is a diagram of an arrangement of an optical pickup head apparatus according to Embodiment 6 of the present invention.

FIG. 12 illustrates the optical pickup head apparatus 1200 of Embodiment 6. This apparatus is differentiated from the optical pickup head apparatus 900 (FIG. 9) of Embodiment 5 by the fact that the diffraction grating 6 (FIG. 9) is replaced by another diffraction grating 63. The diffraction grating 63 allows the positional relationship between the spots of diffracted light beams 4a to 4c, 5a to 5c focused on the optical storage medium 20 and the tracks of an optical storage medium 20 to be different. Further, the diffraction grating 63 also allows the elements of a photodetector 13 to receive light beams 4a to 4c and 5a to 5c in different positions. The diffraction grating 63 is designed for generating the diffracted light beams 4a to 4c and 5a to 5c from irradiation of the light source 1 and the light source 2, respectively.

Figure 13A:
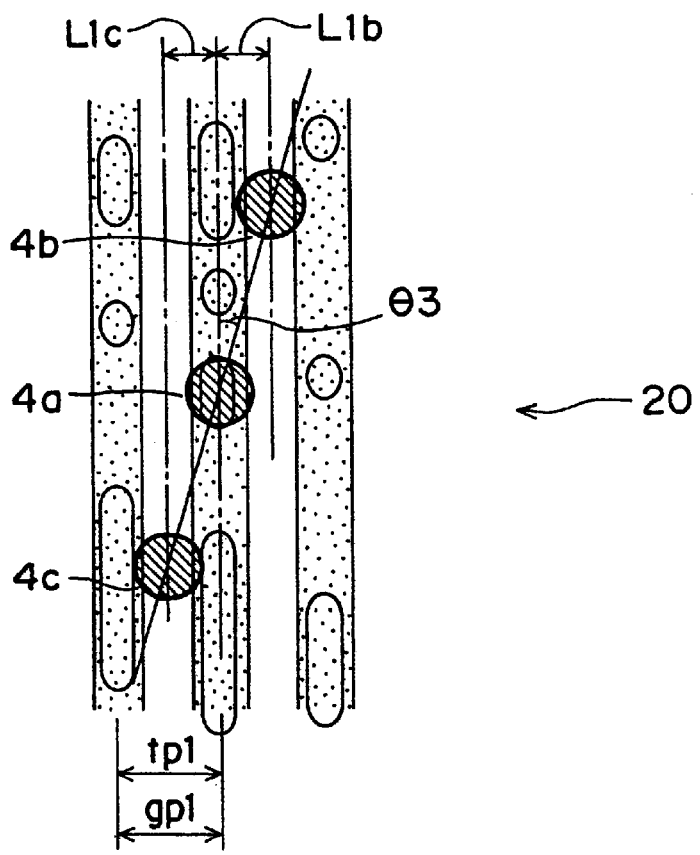
FIG. 13A is a schematic diagram of a group of beams 4a to 4c on the data recording surface of an optical storage medium.
Figure 13B:
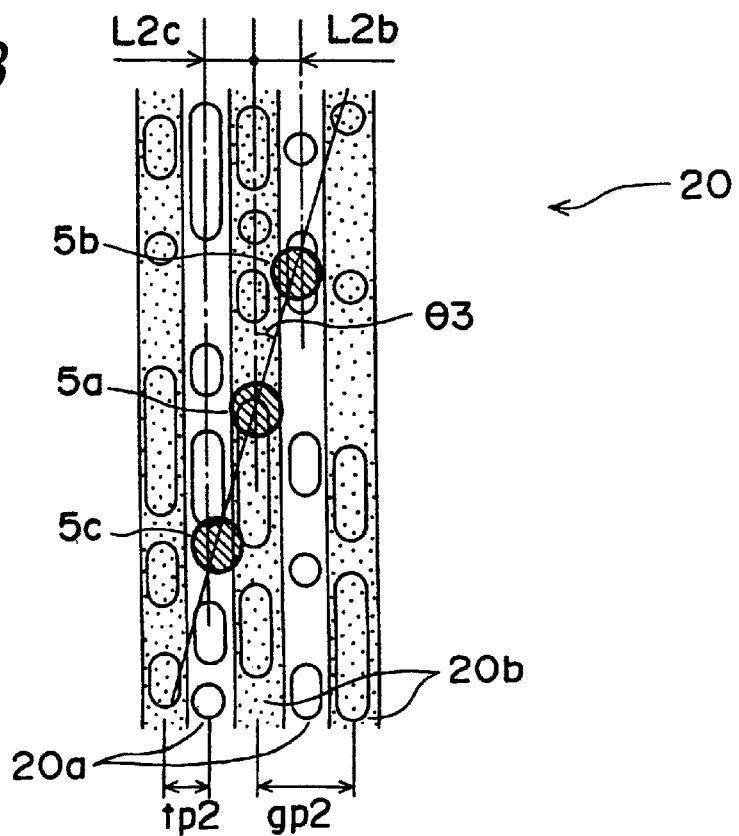
FIG. 13B is a schematic diagram of a group of beams 5a to 5c on the data recording surface of an optical storage medium.

FIGS. 13A and 13B show the positional relationship between the beams 4a to 4c and the tracks on the data recording surface 22 of the optical storage medium 20 and between the beams 5a to 5c and the same, respectively. As shown in FIG. 13A, the beams 4a and 4c are focused on the track of the optical storage medium 20 of CD-R format. The CD-R format has a groove pitch gp1 of 1.6 μm and carries a row of data marks developed in a groove or between grooves. The data mark measures 0.8 μm to 3.0 μm in length and 0.6 μm in width. Unlike DVD-RAM, this format has the groove pitch gp1 arranged identical to a track pitch tp1. The diffracted light beams 4a to 4c generated by the diffraction grating 63 are classified into a zero-order diffracted light 4a, a positive first-order diffracted light 4b, and a negative first-order diffracted light 4c. The diffraction grating 63 is tilted to θ3 such that the displacement L1b or L1c of the beam 4b or 4c from the beam 4a along the tracking pitch is equal to 0.8 μm (=tp1/2).

FIG. 11B schematically illustrates the beams 5a to 5c focused on the track of the optical storage medium 20 of DVD-RAM format. As the displacement L2b or L2c of the beam 5b or 5c from the beam 5a along the tracking pitch is provided on one grating pattern of the diffraction grating 63, its angle θ3 for DVD can be automatically set by the adjustment of the beams relative to the track on the CD. The displacement is 0.67 μm. This is smaller than the displacement 0.74 μm of Embodiment 2 and may slightly decline the amplitude of the tracking error signal but not develop any offset signal. The DVD-RAM format also includes 0.62 μm of a tracking pitch standard. For reading out data from the disk with 0.62 μm of the tracking pitch not 0.74 μm, the optical pickup head apparatus 1200 (FIG. 12) of this embodiment can preferably be used. This is because this embodiment inhibits significant declination of the tracking error signal throughout a range of the applicable storage mediums.

The diffraction grating 63 of this embodiment which is provided as a single unit allows the diffracted light beams 4a to 4c or 5a to 5c to be aligned in a straight row on the photodetector 13. The tracking error signal is obtained by differential phase detection method of comparing the phases of I13a to I13d when the storage medium is a DVD-ROM and otherwise, by differential push-pull method as expressed by (I13a+I13d)−(I13b+I13c)+k1·{(I13e−I13f)+k2·(I13g−I13h). The values k1 and k2 are coefficients for correcting the amplitude of the signal according to the diffraction efficiency of the diffraction grating 63 and the reflectivity of the optical storage medium 20.

The optical pickup head apparatus 1200 (FIG. 12) of this embodiment is favorably applicable to a data record/playback apparatus which can record data onto disks such as CD-R and DVD-RAM. The optical pickup head apparatus 1200 (FIG. 12) like the optical pickup head apparatus 600 (FIG. 6) of Embodiment 3 allows the diffraction grating 63 (FIG. 12) to be adjusted for one of the two formats, CD and DVD, so that the other format can automatically be enabled for playback, hence making the step of adjustment simplified.

Embodiment 7

This embodiment incorporates an optical pickup head apparatus which has a prism arranged for optimum use when light beams emitted from two different light sources are different in astigmatism.

Figure 14:
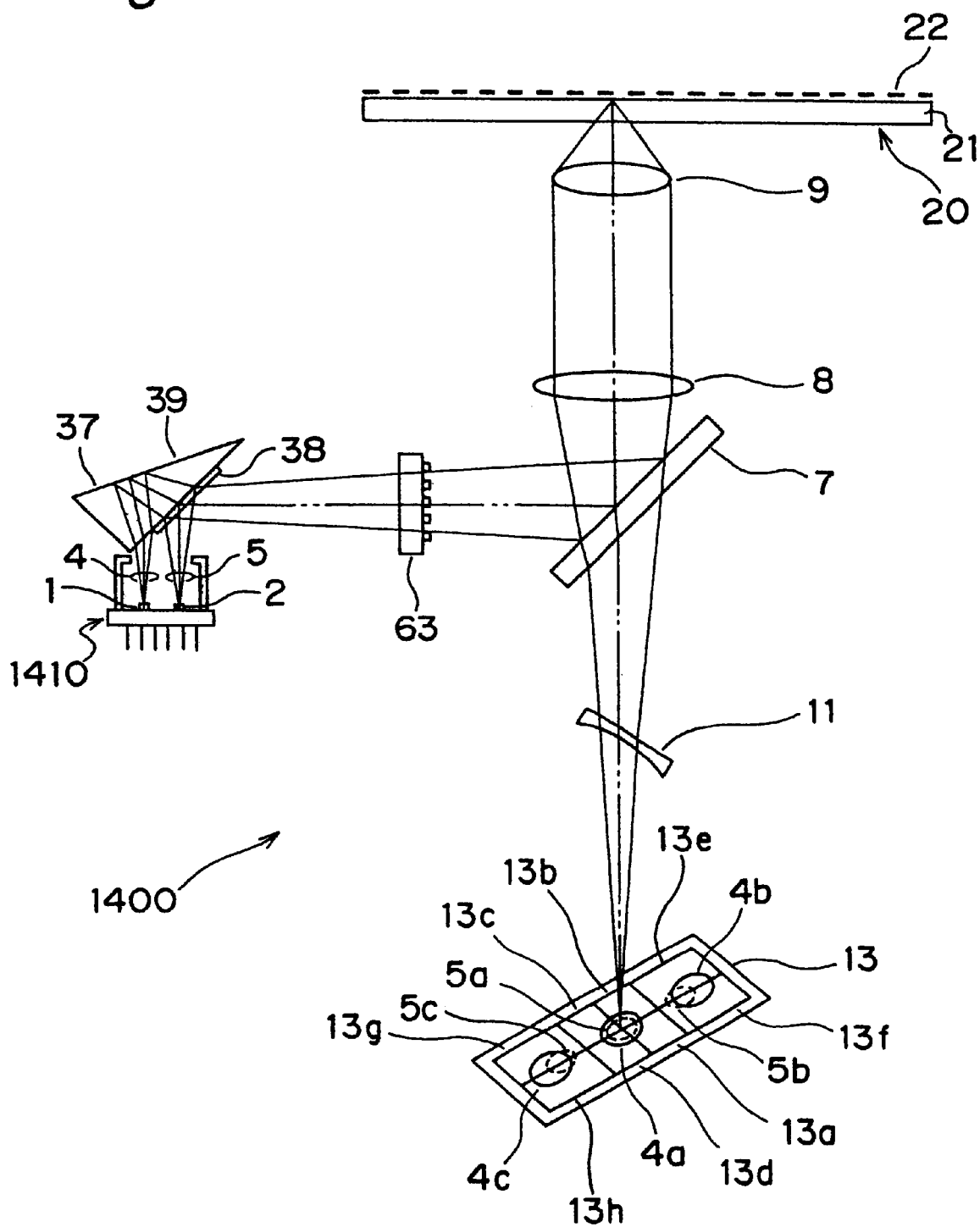
FIG. 14 is a diagram of an arrangement of an optical pickup head apparatus according to Embodiment 7 of the present invention.

FIG. 14 illustrates the optical pickup head apparatus 1400 of Embodiment 7. This apparatus is differentiated from the optical pickup head apparatus 1200 (FIG. 12) of Embodiment 6 by the fact that the prism 3 (FIG. 12) is replaced by another prism 37.

The prism 37 has a total reflecting surface 39 and a dichroic surface 38 which is wavelength selective. A light beam 4 emitted from the light source 1 is reflected on the total reflecting surface 39 and passed through the dichroic surface 38. On the other hand, a light beam 5 emitted from the light source 2 is reflected on the dichroic surface 38. Both the light beams 4 and 5 run along the same path after the prism 37.

The light beam 4 from the light source 1 possesses substantially an astigmatic difference of 20 (m such as a gain waveguide laser beam and is directed to the prism 37 where its astigmatic difference is eliminated. The light beam 5 from the light source 2 is not passed through the prism 37 and has no astigmatism. When there is an astigmatic difference between the two light beams from their respective light sources, one of the two light beams is corrected in astigmatic difference. This permits the two light beams from the prism 37 to be decreased in the astigmatism, thus contributing the improvement of the reading of data from any optical storage medium 20. More specifically, when there is a difference in the astigmatism between the two light beams from their respective light sources, the optical pickup head apparatus of this embodiment can favorably be used.

The optical pickup head apparatus 1400 like the optical pickup head apparatus 1200 (FIG. 12) of Embodiment 6 has a diffraction grating 63 arranged adjustable for one of the two formats, CD and DVD, so that the other format can automatically be enabled for playback, hence making the step of adjustment simplified.

The optical system may be modified and changed without departing from the scope of the present invention.

Embodiment 8

This embodiment is in the form of an optical data apparatus employing the optical pickup head apparatus of any of the foregoing embodiments.

Figure 15:
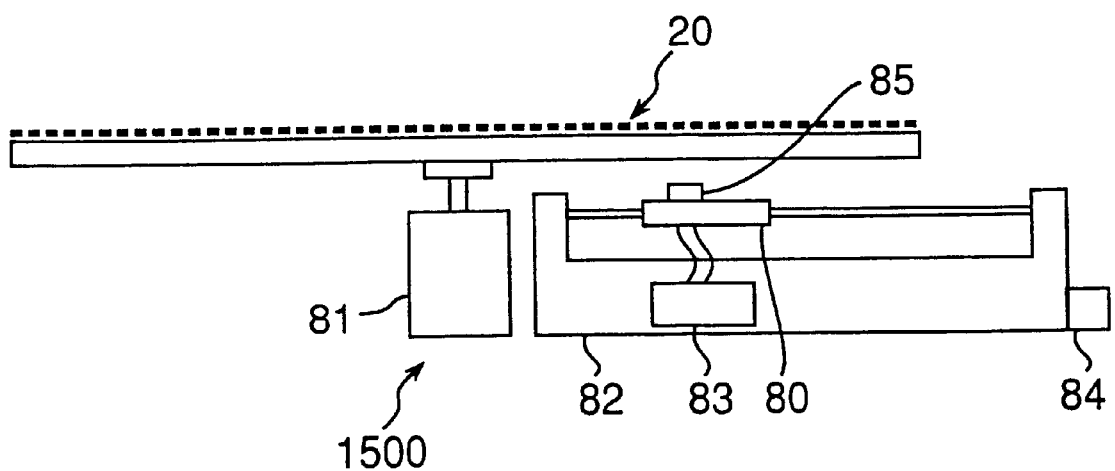
FIG. 15 is a diagram of an arrangement of an optical data apparatus according to Embodiment 8 of the present invention.

FIG. 15 illustrates the optical data apparatus 1500. An optical storage medium 20 loaded on the optical data apparatus 1500 is rotated by an optical storage medium drive 81. The optical pickup head apparatus 80 supplies an electric circuit 83 with a signal corresponding to its relative position on the optical storage medium 20. The electric circuit 83 amplifies or calculates the signal to slightly move the optical pickup head apparatus 80 or an objective lens in the pickup head apparatus 80. A drive 82 is provided for driving the optical pickup head apparatus 80 and an objective lens drive 85 is provided for driving the objective lens in the pickup head apparatus 80. The drive 82 or 85 performs a focusing/tracking servo control operation over the optical storage medium 20 to write, read, or delete data on the optical storage medium 20. An interface 84 connects the apparatus with a power supply or an external power source. More particularly, the electric circuit 83, the drive 82 for the pickup head apparatus, the optical storage medium drive 81 and the objective lens drive 85 are energized through the interface 84. The interface or connecting terminals to the power supply or external source may be provided in each of the drives or circuits.

As set forth above, the present invention permits the non-polarizing prism to align the optical axis of a first wavelength light substantially with the optical axis of a second wavelength light reflected on the second reflecting surface of the prism. As a result, the two non-polarized light beams are received as if emitted from one signal light source. When this light source arrangement is used in an optical pickup head apparatus, the need of a conventional ¼ wavelength plate will successfully be eliminated. This allows the assembly and adjustment of optical components to be simplified during the production of an optical pickup head apparatus as easy as of a conventional optical pickup head apparatus which has a single light source.

Even if the optical storage medium is partially birefringent, the intensity of light received by the photodetector can remain unchanged, hence ensuring appropriate playback of data on the data apparatus.

Also, during the assembling of the optical pickup head apparatus, the diffraction grating is adjustably positioned to match one of any two formats, CD and DVD, of the optical storage medium while its adjustment for the other format is automatically done at the same time. As a result, the optical pickup head apparatus will highly be improved in productivity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light source package comprising
   a first light source operable to emit a first light beam;
   a second light source operable to emit a second light beam which is different from the first light beam; and
   a deflection arrangement operable to deflect the first and second light beams and release the deflected light beam as a third light beam,
   wherein said deflection arrangement includes a first deflector operable to deflect the first light beam and a second deflector operable to deflect the second light beam such that an optical axis of the first deflected light beam from said first deflector and an optical axis of the second deflected light beam from said second deflector substantially coincide, and
   wherein said deflection arrangement also includes a third deflector which further deflects the first and second deflected light beams received from said first and second deflectors, respectively.

2. The light source package according to claim 1, wherein said first, second and third deflectors are provided substantially on two parallel transparent substrates.

3. An optical pickup head apparatus comprising:
   said light source package according to claim 2;
   a light converging unit operable to converge the third light beam received from said light source package on an optical storage medium;

a beam splitter operable to deflect the third light beam reflected on the optical storage medium; and a photodetector adapted to receive the third deflected light beam from said beam splitter and operable to output a signal relative to an intensity of the third deflected light beam.

4. The optical pickup head apparatus according to claim 3, wherein the first light beam has the wavelength $\lambda 1$ and the second light beam has the wavelength $\lambda 2$, and wherein said beam splitter is a holographic optical element including a first holographic pattern and a second holographic pattern, said first holographic pattern having a higher diffraction efficiency of a beam having the wavelength $\lambda 1$ than that having the wavelength $\lambda 2$ and said second holographic pattern having a higher diffraction efficiency of a beam having the wavelength $\lambda 2$ than having the wavelength $\lambda 1$.

5. A data record/playback apparatus comprising:

said optical pickup head apparatus according to claim 3;

a drive which varies a position of said optical pickup head apparatus relative to the optical storage medium; and an electric signal processor operable to perform an arithmetic operation to reconstruct a desired data in response to the signal received from said optical pickup head apparatus.

6. An optical pickup head apparatus comprising:

a first light source operable to emit a first light beam having a wavelength $\lambda 1$;

a second light source operable to emit a second light beam having a wavelength $\lambda 2$ which is different from the wavelength $\lambda 1$;

a diffractor operable to generate a plurality of light beams from the first and second light beams emitted from said first and second light sources, respectively;

a light converging unit operable to converge the plurality of light beams received from said diffractor on an optical storage medium;

a beam splitter operable to deflect the plurality of light beams converged and reflected on the optical storage medium; and a photodetector adapted to receive the deflected light beams from said beam splitter and operable to output a signal relative to an intensity of the deflected light beams, wherein said diffractor includes a first pattern and a second pattern provided at an angle to each other, said first pattern having a higher diffraction efficiency of a beam having the wavelength $\lambda 1$ than that having the wavelength $\lambda 2$ and said second pattern having a higher diffraction efficiency of a beam having the wavelength $\lambda 2$ than that having the wavelength $\lambda 1$.

7. The optical pickup head apparatus according to claim 6, wherein said first pattern is operable to generate first diffracted lights from substantially the first light beam having the wavelength $\lambda 1$ while said second pattern is operable to generate second diffracted lights from substantially the second light beam having the wavelength $\lambda 2$.

8. The optical pickup head apparatus according to claim 7, wherein in interval of the first diffracted lights generated by said first pattern and an interval of the second diffracted lights generated by said second pattern have substantially a same length.

9. The optical pickup head apparatus according to claim 6, wherein a line extending across the first diffracted lights generated by said first pattern, and a line extending across the second diffracted lights generated by said second pattern substantially coincide on said photodetector.

10. An optical pickup head apparatus comprising:

a first light source operable to emit a first light beam;

a second light source operable to emit a second light beam which is different in wavelength from the first light beam;

a deflector operable to deflect the first light beam emitted from said first light source and the second light beam emitted from said second light source and release the first light beam and the second light beam as a third light beam along a single optical axis;

a diffractor operable to generate a plurality of light beams from said third light beam received from said deflector;

a light converging unit operable to converge the plurality of light beams received from said diffractor on an optical storage medium;

a beam splitter operable to deflect the light beams converged and reflected on the optical storage medium; and a photodetector adapted to receive a deflected light beam from said beam splitter and operable to output a signal relative to an intensity of the deflected light beam.

11. An optical pickup head apparatus comprising:

a first light source operable to emit a first light beam having a wavelength $\lambda 1$;

a second light source operable to emit a second light beam having a wavelength $\lambda 2$ which is different from the wavelength $\lambda 1$;

a light converging unit operable to converge the first light beam received from said first light source and the second light beam received from said second light source on an optical storage medium;

a beam splitter operable to deflect the first and second light beams converged and reflected on the optical storage medium; and a photodetector adapted to receive the deflected light beams from said beam splitter and operable to output a signal relative to an intensity of the deflected light beams, wherein said beam splitter is a holographic optical element including a first holographic pattern and a second holographic pattern, said first holographic pattern having a higher diffraction efficiency of a beam having a wavelength $\lambda 1$ than that having a wavelength $\lambda 2$ and said second holographic pattern having a higher diffraction efficiency of a beam having the a wavelength $\lambda 2$ than that having the wavelength $\lambda 1$.

12. The optical pickup head apparatus according to claim 11, wherein said first holographic pattern and said second holographic pattern are operable to generate diffracted light beams that are substantially coincide on said photodetector.

13. The optical pickup head apparatus according to claim 11, wherein said first light source, said second light source, and said photodetector are provided as a single unit.

14. The optical pickup head apparatus according to claim 13, wherein said photodetector is adapted to receive conjugate light beams from said holographic optical element.

* * * * *

UNITED STATES PATENT AND TRADEMARK OFFICE
CERTIFICATE OF CORRECTION

PATENT NO. : 6,654,336 B2
DATED : November 25, 2003
INVENTOR(S) : Shin-ichi Kadowaki et al.

It is certified that error appears in the above-identified patent and that said Letters Patent is hereby corrected as shown below:

Title page,
Please add:
-- [30]   Foreign Application Priority Data

July 7, 2000(JP)................................. 2000-206586 --

Item [57], ABSTRACT,
Line 1, please replace "The light source package comprises a" with -- A light source package has a --.
Line 5, please replace "light beam and releasing the" with -- light beams and releases --.
Line 6, please replace "includes a" with -- includes --.
Line 7, please replace "which deflects the" with -- which deflect the --.
Line 8, please replace "that the optical axes" with -- that optical axes --.
Line 9, please replace "beams are substantially" with -- beams substantially --.

Colunm 15,
Line 59, please replace "wherein in interval" with -- wherein an interval --.

Column 16,
Line 52, please replace "the a wavelength" with -- the wavelength --.

Signed and Sealed this

Twenty-seventh Day of April, 2004

JON W. DUDAS
*Acting Director of the United States Patent and Trademark Office*